United States Patent
Jones et al.

(10) Patent No.: US 6,961,752 B2
(45) Date of Patent: Nov. 1, 2005

(54) VIRTUAL HISTORY FILES

(75) Inventors: Gregory Alan Jones, Austin, TX (US); Nicole Muirhead, Round Rock, TX (US); Bryan Benjamin Peace, Round Rock, TX (US); Leland James Wiesehuegel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 09/784,591

(22) Filed: Feb. 15, 2001

(65) Prior Publication Data

US 2002/0112012 A1 Aug. 15, 2002

(51) Int. Cl.[7] .............................................. G06F 15/16
(52) U.S. Cl. ...................... 709/203; 709/206; 709/217; 709/218; 709/219; 709/245; 345/1.1; 345/1.2
(58) Field of Search ................................. 709/203, 206, 709/218, 219, 245; 345/1.1, 1.2, 781

(56) References Cited

U.S. PATENT DOCUMENTS

| 5,659,729 A | | 8/1997 | Nielsen ..................... 395/603 |
|---|---|---|---|
| 5,745,681 A | * | 4/1998 | Levine et al. ............... 709/200 |
| 5,983,244 A | | 11/1999 | Nation ....................... 707/501 |
| 6,049,812 A | * | 4/2000 | Bertram et al. ............. 715/516 |
| 6,072,491 A | * | 6/2000 | Yohanan ..................... 345/835 |
| 6,092,100 A | * | 7/2000 | Berstis et al. ............... 709/203 |
| 6,094,662 A | | 7/2000 | Hawes ....................... 707/104 |
| 6,182,113 B1 | * | 1/2001 | Narayanaswami .......... 709/203 |
| 6,211,871 B1 | * | 4/2001 | Himmel et al. ............. 345/744 |
| 6,427,175 B1 | * | 7/2002 | Khan et al. ................. 709/245 |
| 2001/0029527 A1 | * | 10/2001 | Goshen ...................... 709/218 |
| 2004/0165007 A1 | * | 8/2004 | Shafron ...................... 345/781 |

* cited by examiner

*Primary Examiner*—Ario Etienne
*Assistant Examiner*—Yves Dalencourt
(74) *Attorney, Agent, or Firm*—David A. Mims, Jr.; Robert V. Wilder

(57) ABSTRACT

A method and implementing computer system are provided in which a user is enabled to create a virtual history file by selecting a favorites routing sequence (FRS) or preferred sequence of favorite web sites to be visited during a browser session. During a browser session, the user is enabled to change from one site to the next sequential site on the list using only a single point-and-click operation or keystroke combination within the user's browser program. The user is further enabled to selectively modify the FRS to include new individual or groups of sites and/or delete existing individual or groups of sites from the listing, and also to change the particular order of sites to be visited on the FRS. Further, existing individual or groups of virtual history files may also be embedded into other virtual history files.

11 Claims, 5 Drawing Sheets

VIRTUAL HISTORY FILES

FIELD OF THE INVENTION

The present invention relates generally to information processing systems and more particularly to a methodology and implementation for facilitating network navigation through a series of selected network sites.

BACKGROUND OF THE INVENTION

Current computer workstations and personal computers (PCs) have the ability to connect through an Internet Service Provider (ISP) to any of very many network sites available of the World Wide Web (hereinafter the "web"). In general when a user is navigating or "surfing" the web using one of several available browser programs, the user is able to identify or mark the user's favorite web sites in a "favorites" or "bookmark" file during an network session, and then continue surfing to other sites of possible interest. The favorites listing is saved for later use in quickly accessing the web sites previously identified as "favorites". This may be done by simply pointing to a "Favorites" hypertext on a browser screen and clicking on an actuating switch on the pointer device or mouse to open a listing of previously saved favorite sites. At that point, the user can simply point to and click on the particular favorite site which the user wishes to "visit". The browser program will then connect with the indicated web site and the web site page will be presented on the user's display screen. If the user then wishes to "go" to another web site on the Favorites list, the user must again have the favorites listing displayed and scroll to and select from the many sites listed. Depending upon the number of sites in the user's "Favorites" listing, that process can take quite some time. Further, if the adjacent site on the list is inadvertently actuated, the user must wait until that inadvertent site is accessed before the correct site can be selected from the favorites listing.

In most instances, a user has a definite list of favorite sites which the user wishes to visit whenever the user logs on the Internet. As noted, although the user's favorite sites are listed, it takes some time to identify those sites and then to actually access the identified sites from the Favorites listing of browser programs.

Thus there is a need for an improved methodology and implementing system which enables a more advantageous use of available programs on a user terminal by enabling a user to combine the various functions of the programs and providing for selective operational and functional relationships between programs during user terminal sessions.

SUMMARY OF THE INVENTION

A method and implementing system are provided in which a user is enabled to input a favorites routing sequence (FRS) or preferred sequence of web sites to be visited during a browser session. In an exemplary embodiment, during a browser session, the user is enabled to change from one site to the next adjacent site on the FRS list using only a single point-and-click operation within the user's browser program. The user is further enabled to selectively modify the FRS to include new favorites sites and/or delete existing favorites sites from the listing, and to also change the particular order of sites to be visited on the FRS and to embed an existing FRS into a new FRS.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a typical computer system 101 which may include a workstation, personal computer, laptop computer, cellular or wireless phone, and other wireless Internet devices such as so-called Personal Digital Assistant devices. In general, an implementing computer system may include a plurality of processors in a multi-bus system in a network of similar systems. However, since the workstation or computer system 101 implementing the present invention in an exemplary embodiment, is generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

Figure 1:
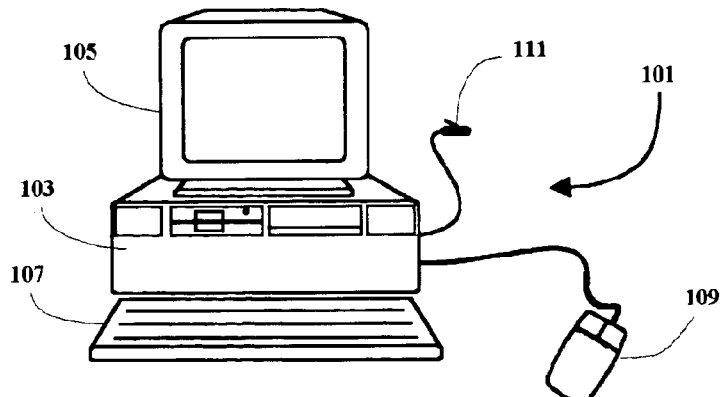
FIG. 1 is a diagram of a computer system in which the present invention may be implemented.

In FIG. 1, the computer system includes an electronics enclosure 103 which is typically arranged for housing one or more CPUs (central processing units) along with other component devices and subsystems of the computer system 101. The computer system 101 also includes a monitor unit 105, a keyboard 107 and a mouse or pointing device 109, which are all interconnected within the illustrated computer system. The present invention may also be implemented in a laptop computer having a display device other than a CRT (cathode ray tube). Also shown in FIG. 1 is a connector 111 which is arranged for connecting a modem within the computer system to a communication line such as a telephone line in the present example. The present invention may also be implemented in a cellular system without the connector 111, and/or hard-wired to a network system through a separate cable (not shown).

Figure 2:
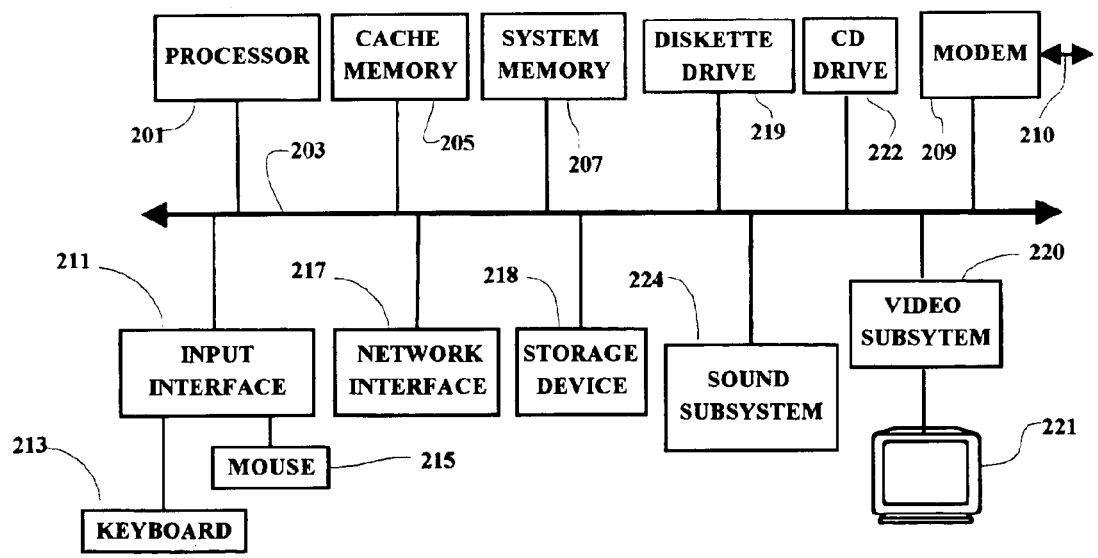
FIG. 2 is a simplified schematic diagram showing selected components and subsystems of the computer system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations and is not intended to be limited to the example illustrated. A cache memory device 205, and a system memory unit 207 are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a separate network subsystem interface 217, a diskette drive unit 219 and a CD drive device 222. A video subsystem 220, which may include a graphics subsystem, is connected to a display device 221. As hereinbefore noted, the display device may be of any known technology for presenting display screens to a user. A storage device 218, such as a hard drive unit, is also coupled to the bus 203. The diskette drive 219 and CD drive unit 222 provide a means by which individual diskette or CD programs may be loaded on to the hard drive, and accessed for selective execution by the computer system 101. As is well known, program diskettes containing application programs represented by magnetic or optical indicia on the diskette or CD, respectively, or programs in system memory, or acquired through a local network or through the world wide web may be read to provide program signals. Such program signals are selectively effective to cause the computer system to present displays on the screen of a display device and respond to user inputs in accordance with the functional flow of the application program being executed.

In running an Internet access program or browser program on the computer system 101, the access program is typically stored in the storage device 218 and either selectively or automatically, partially or totally, loaded into the system memory 207 when the system is initially powered-on, or at a later time if so desired by a user. The browser is selectively operable to access and execute a site selection program either directly from a diskette or CD in a drive unit or directly from a copy of the site selection program stored on the hard drive unit 218. As a program is running, either a portion of the program or the entire program may be loaded into the system memory 207 and/or the system cache memory 205. Depending on specific program or system design, the system may store any information accessed from a database in the storage unit 218, the cache memory 205, the system memory 207 or from a diskette or CD loaded into the corresponding drive unit 219 or 222. Assuming a user has started-up the system, and is actively running a browser program for example, from memory, a series of screens will be displayed to the user on the display device 221. Each screen typically has one or more selections for the user to make in navigating through the program. In general, a user will make selections from a display screen using the keyboard 213 or the mouse or pointer device 215. In an Internet browser program, the selections made by the user will determine "where" the user "goes", i.e. to what "site" or "webpage", and also, in some cases, the communications link or the path taken to get to the site selected.

Figure 3:
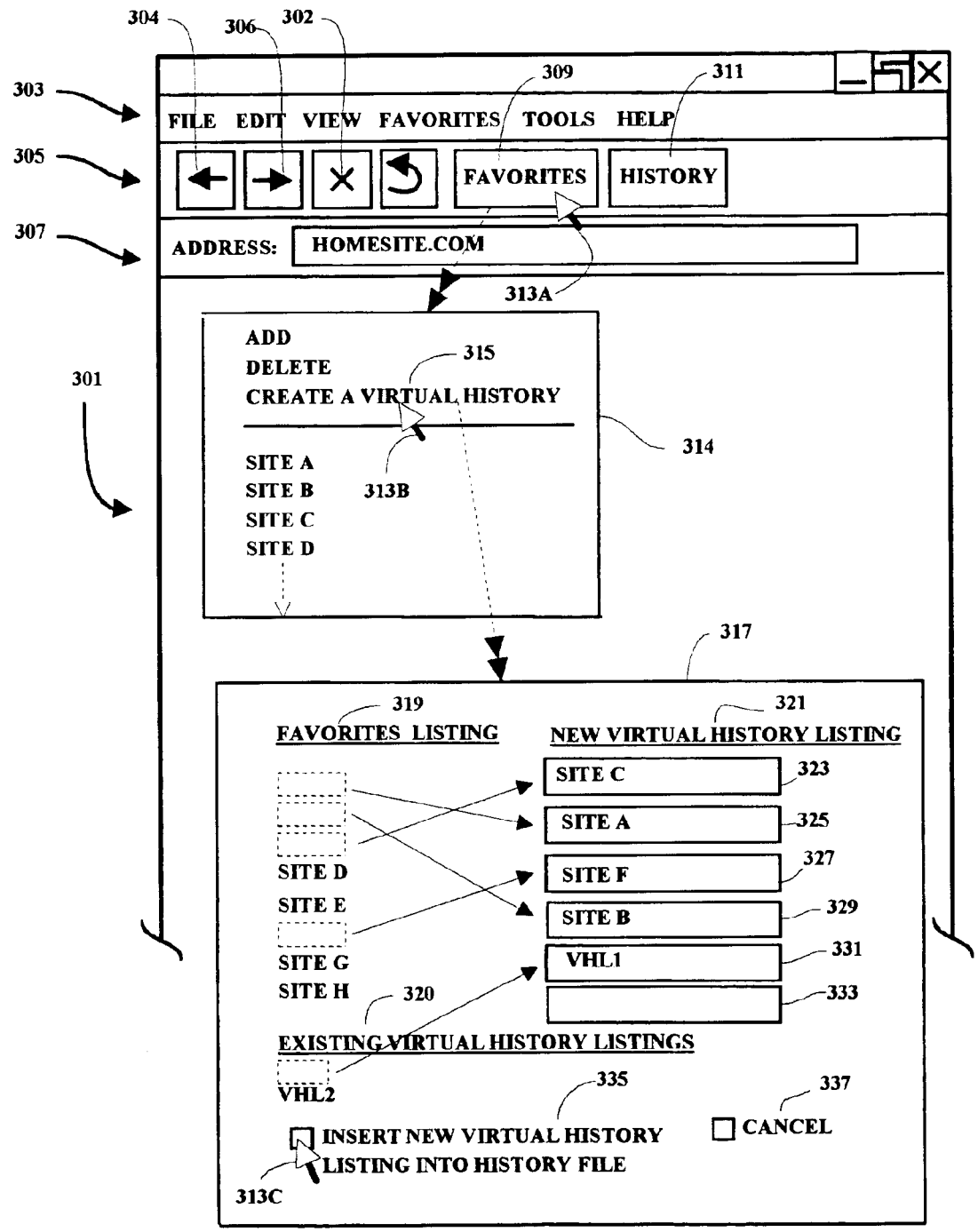
FIG. 3 is an illustration of an exemplary display screen showing several exemplary program windows useful in explaining one aspect of the present invention.

FIG. 3 illustrates a typical program screen display 301 in an Internet operating session. The browser screen generally includes several rows 303 and 305, of selectable hypertext items such as "FILE", "EDIT" "FAVORITES" 309, "HISTORY" 311, etc., from which a user may select to determine the next function of the browser program. An "ADDRESS" or "location" section 307 enables a user to key-in, and also displays the name of, an internet address of a site to be, or being, visited. Other quick access buttons may be implemented on the screen for quick access to other selected network services and/or network functions including network searches and or media sites. In general, any of the illustrated items may be selected through a "point and click" methodology associated with the mouse device 215, and a cursor or pointer indicium, e.g. 313, visible on the display screen. For example, a download of data from a remote site may be immediately terminated during the transmission by pointing to the "Stop" or "X" button 302 and clicking on a designated mouse button. Similarly, the "Back" (backward arrow 304) and "Forward" (forward arrow 306) buttons may be used to return to the last screen display or go forward to the next screen display, respectively. The back arrow 304 and forward arrow 306 are clicked to navigate to the last site visited by the user or the next site on the History file listing. The History file is automatically maintained by the browser program and is accessed and used in connection with the back and forward arrows to enable quick back and forth movement to adjacent sites visited on the web. The history file is maintained by the browser program without any specific user input.

In the FIG. 3 example, the "location" or "URL (uniform resource locator) designation is illustrated as Homesite.com". As illustrated, when a user moves the pointer to position 313A and clicks on the "FAVORITES" hypertext 309, a further selection screen 314 is presented which allows the user to select a website which the user wishes to access, e.g. Sites A–D, or to make another selection. For example, the user may also select "ADD" in order to add the current website to the favorites list, "DELETE" in order to delete a selected site from the list. In accordance with the exemplary embodiment of the present invention, the user may also select the hypertext "CREATE A VIRTUAL HISTORY" in order to enable the user to create a listing of the user's favorite sites which will be used in connection with the Back arrow 304 and Forward arrow 306 to quickly navigate through the user's selected favorite sites using only a single point and click operation to go from one site to the next. The term "hypertext" as used herein means a word or text string or icon on a display screen which can be pointed to by a displayed pointer and, in connection with an actuation of a mouse button, can be used to cause an action to be initiated by the browser program.

As shown, when the user moves the cursor to position 313B and clicks on the "CREATE A VIRTUAL HISTORY FILE" 315, another pop-up-screen 317 appears in the example. Screen 317 includes a "FAVORITES LISTING" section 319, an "EXISTING VIRTUAL HISTORY LISTING" 320 and a "NEW VIRTUAL HISTORY LISTING" 321. When the screen 317 first appears, a duplicate copy of the FAVORITES listing associated with the FAVORITES function 309 is created and displayed in the illustrated example. It is noted that this presentation is created as a copy or a duplicate of the Favorites Listing and does not affect the Favorites Listing associated with the Favorites function 309 which remain operable as hereinbefore described. The duplicate Favorites Listing 319 and the Existing Virtual History Listings 320 are created to enable the user to select which ones of the listed sites will be included in the New Virtual History Listing 321 to be created by the user. Initially, the New Virtual History Listing 321 includes a series of blank boxes 323, 325, 327, 329, 331 and 333. The user then, by a drag-and-drop pointer technique for example, is able to drag-and-drop the selected favorite site identifiers appearing on the duplicate Favorites Listing 319 and the Existing Virtual History Listings 320 over to the appropriate box in the New Virtual History Listing column 321 in the order in which the user wished to visit those sites in subsequent Internet sessions for example. As shown in the example, the user desires to visit Sites C, A, F, B, and the sites contained in Virtual History List 1 (VHL1) in that order during the user's next Internet session. Accordingly, the user has inserted Site C from the Favorites Listing 319 into the first block 323 of the Virtual History Listing 321. Similarly, Site A is inserted into block 325, Site F is inserted into block 327, Site B is inserted into block 329 and VHL1 is inserted into block 331. Users may select any block and insert selected sites in any order into the New Virtual History Listing 321. Moreover, as illustrated, there may be more than one Virtual History Listing and the user may select to insert one or more of the several Virtual History Listings created by the user into the History Listing of the browser program in any sequence desired.

It is noted that a site need not be identified as a "Favorite" to be included in a New Virtual History file. Users may enter a URL (Uniform Resource Locator) instead of selecting a listed Favorite URL. Additionally, users may select a group of Favorites, i.e. a folder, to include in the New Virtual History. Since multiple Virtual History Files can exist, it is further noted that one Virtual History can be embedded into another Virtual History. For example, a Virtual History file containing two financial websites could be embedded into a virtual history file containing "business sites" in general.

Figure 6:
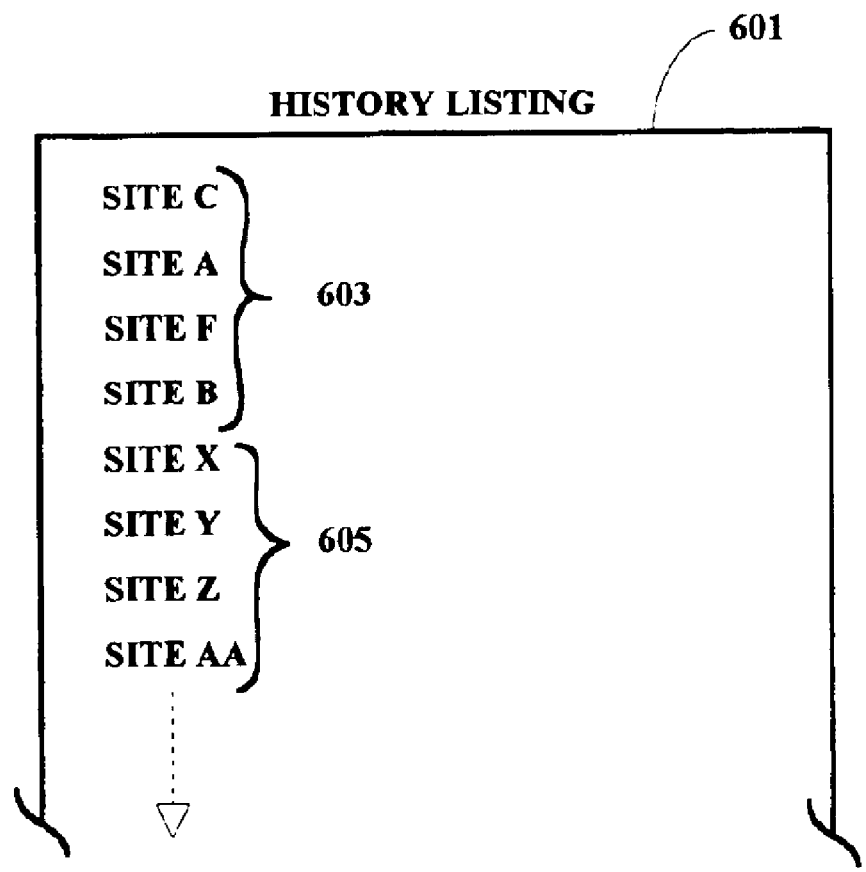
FIG. 6 is illustration of an exemplary screen display showing an exemplary history file listing after an execution of the methodology of the present invention.

After, the preferred sites have been inserted into the New Virtual History Listing 321, the user is then enabled to Cancel 337 if the user wishes to exit the operation, or the user may select to proceed to INSER NEW VIRTUAL HISTORY LISTING INTO HISTORY FILE 335 by moving the pointer to position 313C and clicking on the mouse button. The user may then, depending upon the system configuration, close the browser program and the next time the browser is opened, the previously created New Virtual History Listing will be at the top (or bottom) of the HISTORY LISTING File which is associated with the HISTORY button 311 (FIG. 3), i.e. when the user actuates or points to and clicks on the HISTORY hypertext 311, the listing as shown in FIG. 6 will be presented. The particular implementation of the method for providing a listing of a preferred sequence of preferred web sites as shown in FIG. 3 is but one example, and it is understood that many other particular implementations are possible to enable a creation of a listing of a preferred sequence of preferred web sites for use as herein described.

As shown in FIG. 6, the History Listing 601 which is displayed in response to the actuation of the HISTORY button 311, includes the selected sites "C", "A", "F" and "B", in the user-selected sequence, at the top of the listing 603. The remaining portion 605 of the History Listing 601 includes the normal listing of sites last visited by the user. When the browser initiates and goes to the user's home page, the user may then next proceed to his favorite sites in sequence by merely pointing to and clicking once upon the Back Arrow button 304. The program will then automatically insert the next site on the History Listing to access.

Figure 4:
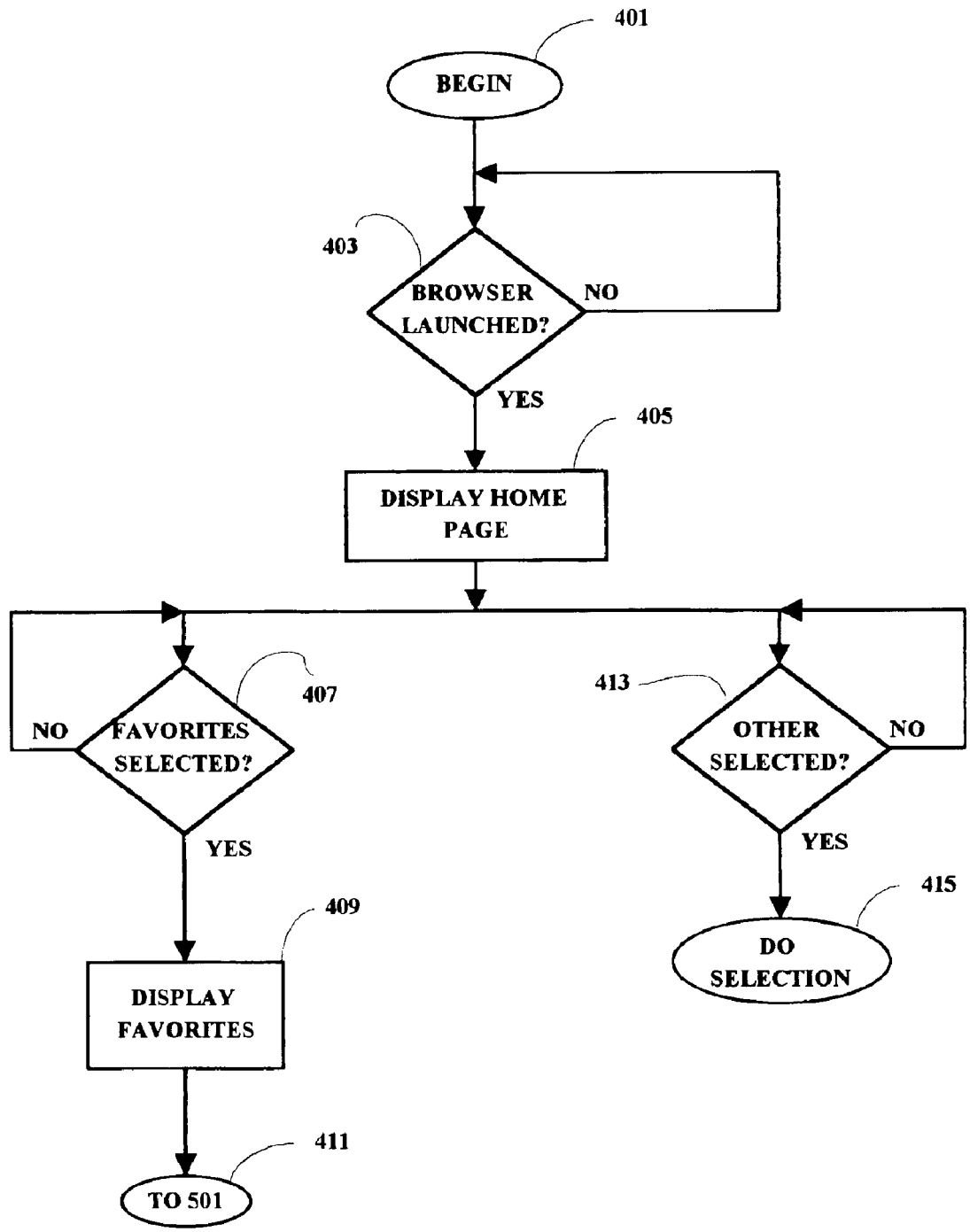
FIG. 4 is a flowchart illustrating a portion of an exemplary methodology for implementing the present invention.

As shown in FIG. 4, in flowchart form, the methodology begins 401 and determines that the browser has been launched 403. Next the home page is displayed 405. The program then determines if the Favorites icon has been selected 407 or if another icon is selected 413 by the user. If another icon or function is selected by the user 413 then the program performs the appropriate action 415 which is not herein further discussed. If however, the user selects 407 the Favorites icon (309 in FIG. 3), then the Favorites listing is displayed 409 (see 314 FIG. 3) and the process moves to point 501 in FIG. 5.

Figure 5:
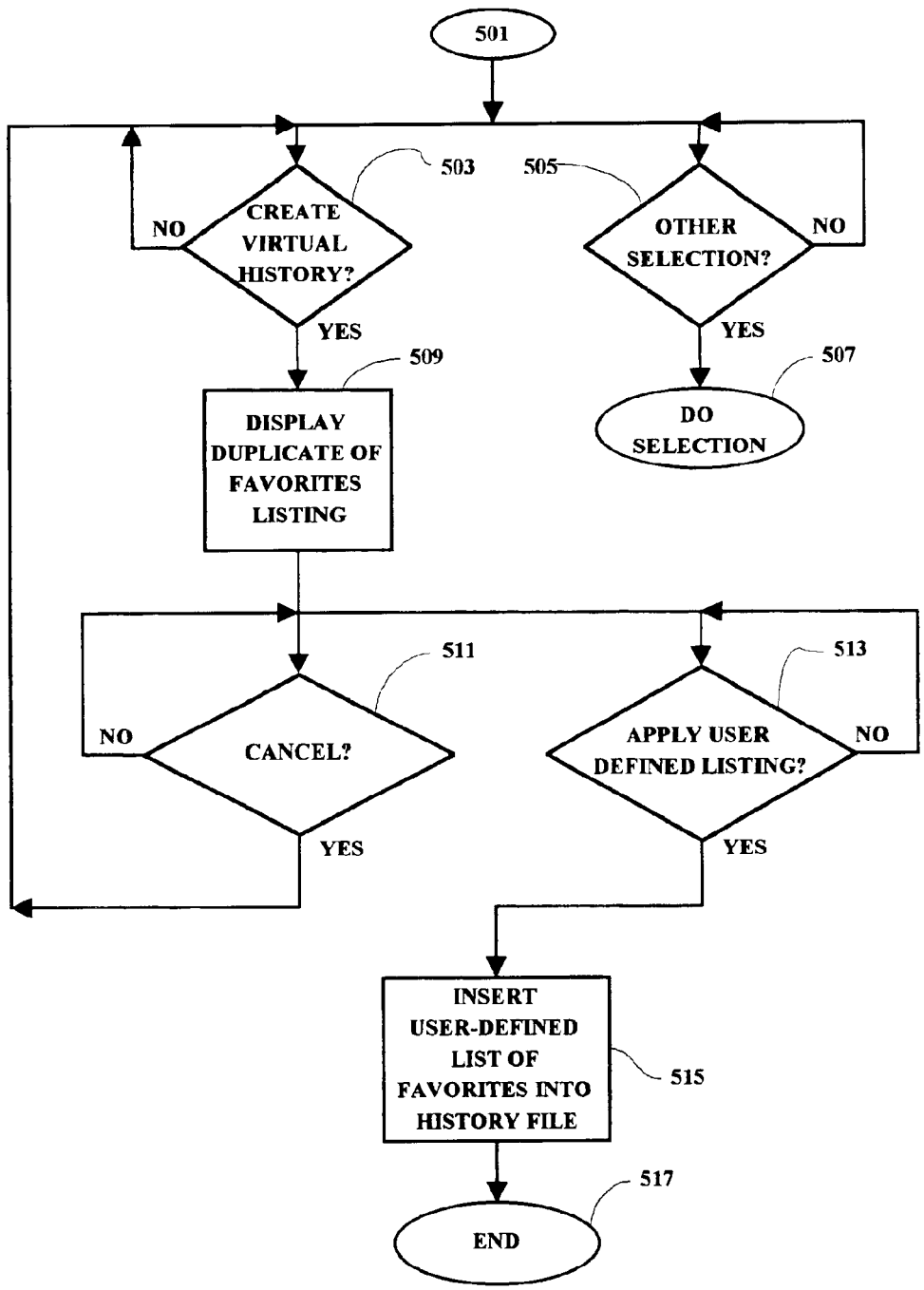
FIG. 5 is a flowchart illustrating a continuation of the flowchart illustrated in FIG. 4.

As shown in FIG. 5, after the Favorites screen 314 is presented 409, the program determines whether the user selects the CREATE VIRTUAL HISTORY function 503 or makes another selection 505. If another selection is made 505, the program initiates the selection 507 and continues as appropriate. Further discussion of the selection 507 is not necessary in connection with the present invention. However, if the user selects to CREATE A VIRTUAL HISTORY 503, the Virtual History Screen 317 is presented 509 and the user may proceed to create the Virtual History File as hereinbefore discussed. At that point, the user may Cancel 511 (see 337 FIG. 3) and return to the Favorites Screen 314, or select to apply the user-defined Virtual History Listing 513. The user is then enabled to insert 515 the user-created Virtual History Listing 321 into the History File (see FIG. 6) by moving the pointer to position 313C and clicking on the appropriate mouse button as hereinbefore discussed, and the process is terminated 517.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk, diskette or CD, (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for modifying a browser, said browser including a history function operable to store an actual history list of website addresses accessed by said browser, said browser further including separate back and forward indicia on a display screen, said back and forward indicia being selectable by a user for accessing stored website addresses adjacent to a currently displayed website address of said browser, said browser further including a favorites function, said favorites function being operable for selectively storing a favorites list of user-selected website addresses, said method comprising:

displaying said favorites list in a first area of said display screen;

displaying a virtual history list in a second area of said display screen, said virtual history list being separate from said actual history list;

enabling said user to transfer selected website addresses from said displayed favorites list into said displayed virtual history list; and inserting said virtual history list into said actual history list of said browser whereby adjacent ones of said website addresses in said virtual history list are accessible by a single selection of said back or forward indicia of said browser.

2. The method as set forth in claim 1 and further including a pointing device, said pointing device being selectively operable by a user for pointing to said back and forward indicia, said pointing device further including an activating mechanism, said actuating mechanism being selectively operable by said user to effect a selection of said back or forward indicia.

3. The method as set forth in claim 1 wherein said virtual history list is created using a keyboard.

4. The method as set forth in claim 1 wherein said virtual history list is created using a pointing device.

5. The method as set forth in claim 1 and further including creating said virtual history list from individual website addresses and also from previously created groups of said website addresses.

6. A storage medium including machine readable coded indicia, said storage medium being selectively coupled to a reading device, said reading device being selectively coupled to processing circuitry within an information processing system, said reading device being selectively operable to read said machine readable coded indicia and provide program signals representative thereof, said program signals being effective for modifying a browser, said browser including a history function operable to store an actual history list of website addresses accessed by said browser, said browser further including separate back and forward indicia on a display screen, said back and forward indicia being selectable by a user for accessing stored website addresses adjacent to a currently displayed website address of said browser, said browser further including a favorites function, said favorites function being operable for selectively storing a favorites list of user-selected website addresses, said program signals being further operable to accomplish the steps of:

displaying said favorites list in a first area of said display screen;

displaying a virtual history list in a second area of said display screen, said virtual history list being separate from said actual history list;

enabling said user to transfer selected website addresses from said displayed favorites list into said displayed virtual history list; and inserting said virtual history list into said actual history list of said browser whereby adjacent ones of said website addresses in said virtual history list are accessible by a single selection of said back or forward indicia of said browser.

7. The medium as set forth in claim 6 and further including a pointing device, said pointing device being selectively operable by a user for pointing to said back and forward indicia, said pointing device further including an actuating mechanism, said actuating mechanism being selectively operable by said user to effect a selection of said back or forward indicia.

8. The medium as set forth in claim 6 wherein said virtual history list is created using a keyboard.

9. The medium as set forth in claim 6 wherein said virtual history list is created using a pointing device.

10. The medium as set forth in claim 6 and further including creating said virtual history list from individual website addresses and also from previously created groups of said website addresses.

11. An information processing system comprising:

a system bus;

a CPU device connected to said system bus;

a memory device connected to said system bus;

an input device connected to said system bus, said input device being arranged to enable user input to said information processing system;

a user display device connected to said system bus; and connection means arranged to selectively connect said information processing system to a network of websites, each of said websites having a website address, said information processing system being selectively operable for modifying a browser resident in said memory device, said browser including a history function operable to store an actual history list of website addresses accessed by said browser, said browser further including separate back and forward indicia on a display screen of said user display device, said back and forward indicia being selectable by a user for accessing stored website addresses adjacent to a currently displayed website address of said browser, said browser further including a favorites function, said favorites function being operable for selectively storing a favorites list of user-selected website addresses, said information processing system being further selectively operable for displaying said favorites list in a first area of said display screen, displaying a virtual history list in a second area of said display screen, said virtual history list being separate from said actual history list, enabling said user to transfer selected website addresses from said displayed favorites list into said displayed virtual history list, and inserting said virtual history list into said actual history list of said browser whereby adjacent ones of said website addresses in said virtual history list are accessible by a single selection of said back or forward indicia of said browser.

* * * * *